United States Patent [19]

Kochiya et al.

[11] Patent Number: 5,644,783
[45] Date of Patent: Jul. 1, 1997

[54] DEVICE FOR SETTING ASIDE MEMORY FOR USE BY ONE TRANSFER UNIT WHEN NUMBER OF BUSY RESPONSES FOR THE UNIT REGARDING THE MEMORY BECOMES PREDETERMINED NUMBER

[75] Inventors: Toshiaki Kochiya; Soichiro Nagasawa, both of Kawasaki, Japan

[73] Assignee: Fujitsu Limited, Kawasaki, Japan

[21] Appl. No.: 420,696

[22] Filed: Apr. 12, 1995

[30]  Foreign Application Priority Data

Jun. 20, 1994 [JP] Japan .................... 6-137606

[51] Int. Cl.$^6$ ................................ G06F 15/02
[52] U.S. Cl. ................................ 395/837
[58] Field of Search .................... 395/821, 822, 395/823, 837, 838, 839, 480, 490

[56]  References Cited

U.S. PATENT DOCUMENTS

| | | | |
|---|---|---|---|
| 4,115,851 | 9/1978 | Nagano et al. | 395/436 |
| 4,803,653 | 2/1989 | Suzuki et al. | 395/475 |
| 5,016,167 | 5/1991 | Nguyen et al. | 395/478 |
| 5,036,456 | 7/1991 | Koegel | 395/837 |
| 5,175,837 | 12/1992 | Arnold et al. | 395/479 |
| 5,269,011 | 12/1993 | Yanai et al. | 395/280 |
| 5,291,581 | 3/1994 | Cutler | 395/479 |
| 5,327,560 | 7/1994 | Hirata et al. | 395/700 |
| 5,355,455 | 10/1994 | Hilgendorf et al. | 395/306 |
| 5,440,752 | 8/1995 | Lentz | 395/800 |

*Primary Examiner*—Thomas C. Lee
*Assistant Examiner*—Moustafa Mohamed Meky
*Attorney, Agent, or Firm*—Greer, Burns & Crain, Ltd.

[57]  ABSTRACT

An input/output control device controlling data exchange between computers and memory units includes transfer units connected to the computers and accessing the memory units so as to effect the data exchange, an exclusive-control unit for preventing more than one of the transfer units from having access to the same one of the memory units by denying all but one of the transfer units the access, and an expropriation unit for taking control of one of the memory units when one of the transfer units is denied access to the one of the memory units a predetermined number of times, so that the one of the memory units can be set aside for use by the one of the transfer units.

17 Claims, 13 Drawing Sheets

DEVICE FOR SETTING ASIDE MEMORY FOR USE BY ONE TRANSFER UNIT WHEN NUMBER OF BUSY RESPONSES FOR THE UNIT REGARDING THE MEMORY BECOMES PREDETERMINED NUMBER

BACKGROUND OF THE INVENTION

1. Field of the Invention

The present invention generally relates to input/output control devices, and particularly relates to an input/output control device which controls input/output of a semiconductor memory device.

2. Description of the Prior Art

There is a semiconductor memory device which has a semiconductor memory divided into a plurality of logical drives, and which can be connected with a plurality of CPUs (central processing units) and the like capable of accessing each of the logical drives.

Such a semiconductor device is provided with an input/output control device responsible for an exclusion control, so that a plurality of CPUs do not compete for an access of the same logical drive.

In an input/output control device of the prior art, a channel adapter (CA) of a path or a path group issues a reserve command requesting the use of a logical drive. Then, a resource manager (RM) sends a reserve response to the channel adapter so as to give the path or the path group an exclusive use of the logical drive. When another path or another path group issues a reserve command for the use of the same logical drive, the resource manager of the input/output control device sends a device-busy response to the latter path or the latter path group. When the former path or the former path group using the logical drive issues a release command, the resource manager of the input/output control device releases the logical drive, and, then, sends a release response to the former path or the former path group. Also, the resource manager informs the latter path or the latter path group of the availability of the logical drive by sending a busy-to-free response.

Figure 1:
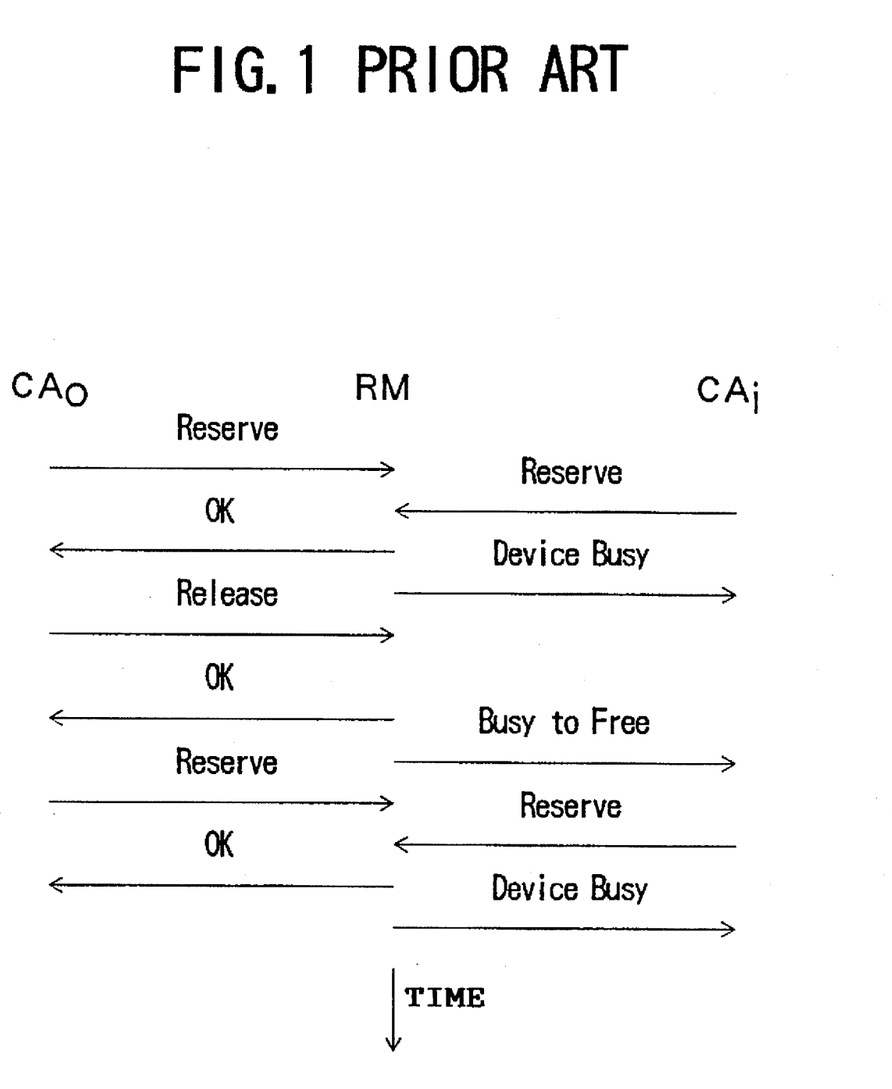
FIG. 1 is a timing chart showing an operation of a resource manager of a prior art responding to reserve commands and release commands issued by two channel adapters.

FIG. 1 shows a timing chart of an operation of the resource manager responding to reserve commands and release commands issued by two channel adapters.

In FIG. 1, a channel adapter $CA_0$ issues a reserve command requesting the use of a logical drive, and, then, another channel adapter $CA_i$ issues a reserve command for the same logical drive. Since the request for the use of the logical drive is made by the channel adapter $CA_0$ first, the resource manager RM sends a reserve response to the channel adapter $CA_0$, and, then, sends a device-busy response to the channel adapter $CA_i$. When the channel adapter $CA_0$ provides a release command, the resource manager RM releases the logical drive and sends a release response to the channel adapter $CA_0$. Also, the resource manager RM sends a busy-to-free response to the channel adapter $CA_i$.

Assume that the channel adapter $CA_0$ issues a reserve command again before the channel adapter $CA_i$ does, as shown in FIG. 1. The resource manager ends up providing a reserve response to the channel adapter $CA_0$. The channel adapter $CA_i$ again receives a device-busy response from the resource manager.

In this manner, when the same path or the same path group keeps issuing a reserve command, a particular path ($CA_i$ in the above example) can end up receiving a device-busy response again and again. This tendency of repeated failure to seize the control of a logical drive is due to a persistent timing difference between the two channel adapters.

Accordingly, there is a need in the field of input/output control devices for an input/output control device which can prevent the same path from repeatedly receiving device-busy responses so as to average out reserve responses granted for each path.

SUMMARY OF THE INVENTION

Accordingly, it is a general object of the present invention to provide an input/output control device which can satisfy the need described above.

It is another and more specific object of the present invention to provide an input/output control device which can prevent the same path from repeatedly receiving a device-busy response so as to average out reserve responses granted for each path.

In order to achieve the above object, an input/output control device controlling data exchange between computers and memory units includes transfer units connected to the computers and accessing the memory units so as to effect the data exchange, an exclusive-control unit for preventing more than one of the transfer units from having access to the same one of the memory units by denying all but one of the transfer units the access, and an expropriation unit for taking control of one of the memory units when one of the transfer units is denied access to the one of the memory units a predetermined number of times, so that the one of the memory units can be set aside for use by the one of the transfer units.

According to the above-described device, when device-busy responses are directed to the same transfer unit the predetermined number of times, the memory unit requested by the transfer unit can be seized by the expropriation unit. Then, the expropriation unit can hand over the control of the memory unit to the transfer unit. Thus, the transfer unit can exclusively use the memory unit ahead of other transfer units without getting denied the access.

Other objects and further features of the present invention will be apparent from the following detailed description when read in conjunction with the accompanying drawings.

DESCRIPTION OF THE PREFERRED EMBODIMENTS

In the following, principles and embodiments of the present invention will be described with reference to the accompanying drawings.

Figure 2A:
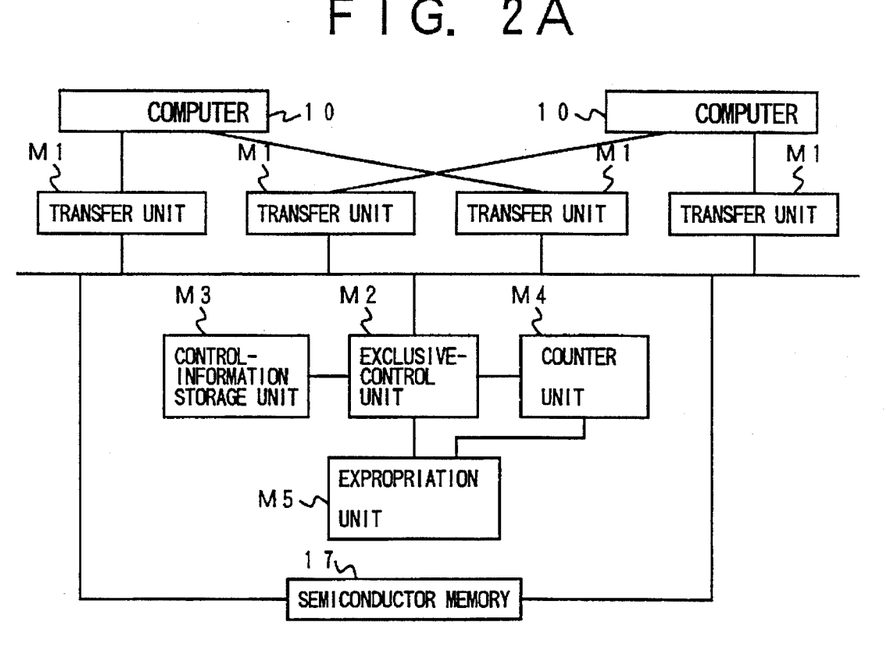
FIGS. 2A and 2B are block diagrams of a principle and its variation, respectively, of the present invention.

FIG. 2A shows a block diagram of a principle of the present invention.

As shown in FIG. 2A, an input/output control device of the principle is connected to a plurality of computers (e.g., CPUs, devices using a memory, etc) 10 and a semiconductor memory 17, and includes transfer units M1, an exclusive-control unit M2, and a control-information storage unit M3. The semiconductor memory 17 is divided into a plurality of logical storage units.

The transfer units M1 carry out data transfer between the computers 10 and the semiconductor memory 17. The exclusive control unit M2 prevents the computers 10 from competing for access to the same logical storage unit. The control-information storage unit M3 stores necessary information for the exclusive control.

The input/output control device also includes a counter unit M4 and an expropriation unit M5.

One of the transfer units is given a command for taking control of a logical storage unit. When the logical storage unit is controlled by another transfer unit, the exclusive control unit M2 sends a device-busy response to the noted one of the transfer units. The number of the device-busy responses which the noted one of the transfer units receives is counted by the counter unit M4.

Once the number of the device-busy responses counted by the counter unit M4 becomes a predetermined number, the expropriation unit M5 seizes the control of the logical storage unit when it is released. Thus, the expropriation unit M5 can prevent other transfer units from getting the exclusive use of the logical storage unit.

Figure 2B:
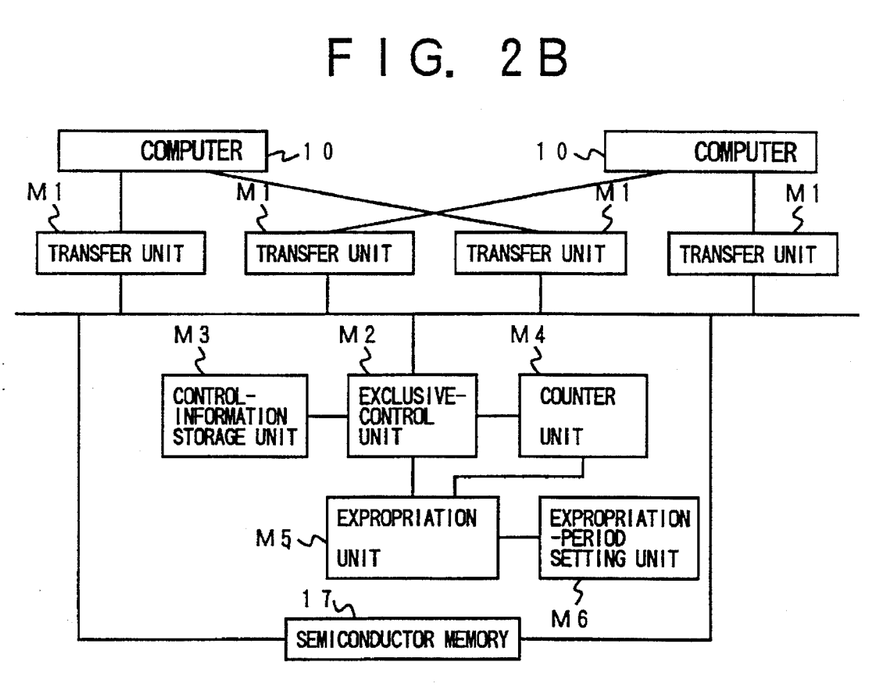

FIG. 2B shows a block diagram of a variation of the principle. An input/output control device of the variation of the principle differs from that of the principle only in an additional element of a expropriation-period setting unit M6. The expropriation-period setting unit M6 is used for setting a period during which the logical storage unit is seized by the expropriation unit M5.

According to the principle of the present invention, when device-busy responses are directed to the same transfer unit M1 the predetermined number of times, the logical storage unit requested by the transfer unit M1 can be seized by the expropriation unit M5. Then, the expropriation unit M5 can hand over the control of the logical storage unit to the transfer unit M1. Thus, the transfer unit M1 can exclusively use the logical storage unit ahead of other transfer units M1 without getting device-busy responses indefinitely.

According to the variation of the principle of the present invention, an input/output control device includes the expropriation-period setting unit M6 for setting the period during which the logical storage unit is seized by the expropriation unit M5. Thus, this period can be set to an appropriate length lest other transfer units M1 cannot use the logical storage unit for a long time.

Figure 3:
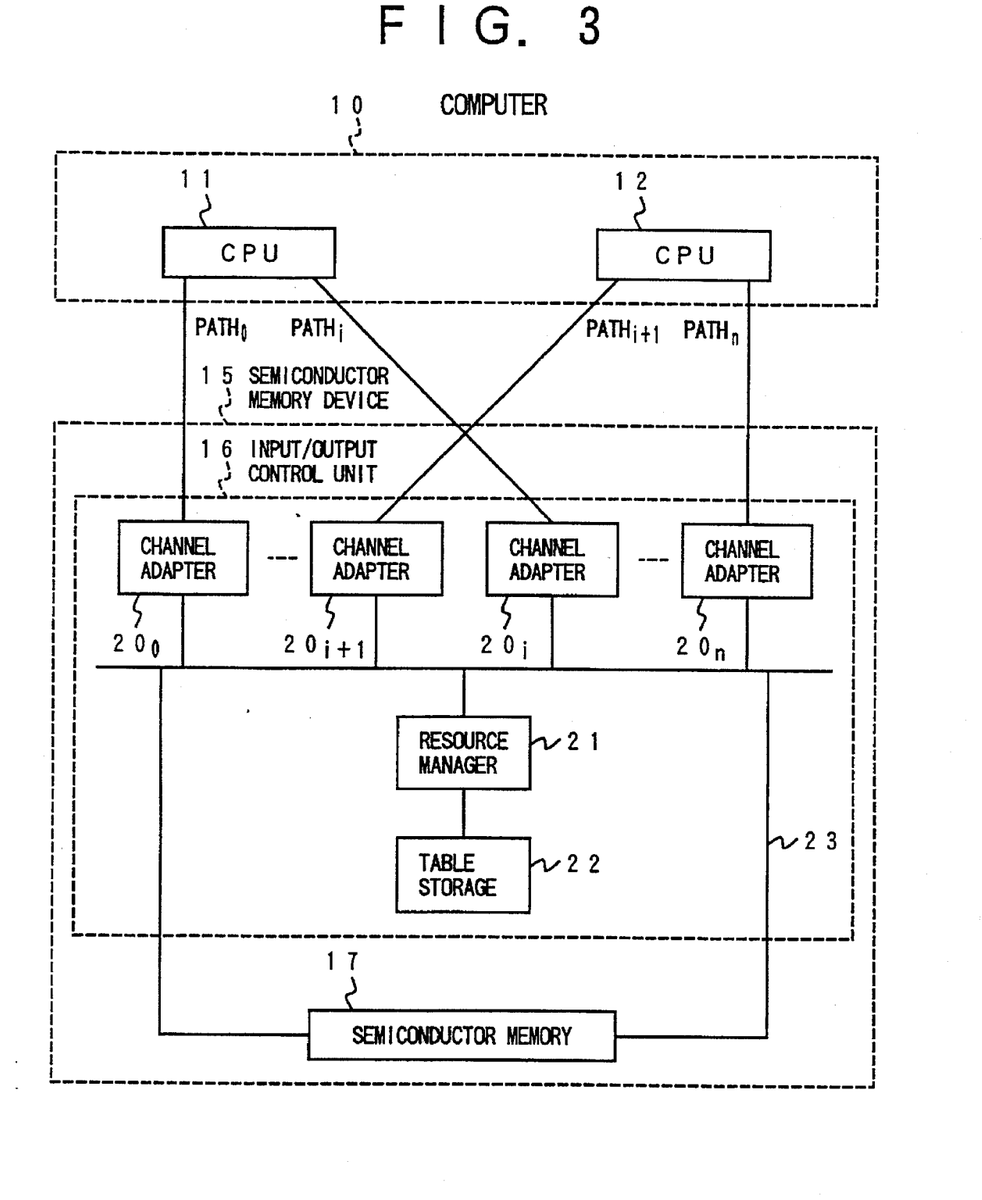
FIG. 3 is a block diagram of a semiconductor memory system employing an embodiment of an input/output control device according to the present invention.

FIG. 3 shows a block diagram of a semiconductor memory system employing an embodiment of an input/output control device according to the present invention. The semiconductor memory system of FIG. 3 includes a computer 10 and a semiconductor memory device 15. The computer 10 includes CPUs 11 and 12. The semiconductor memory device 15 includes an input/output control device 16 and a semiconductor memory 17.

The input/output control device 16 includes channel adapters (CA) $20_0$ through $20_n$, a resource manager 21, and a table storage 22. The channel adapters $20_0$ through $20_n$ correspond to the transfer units M1 of FIG. 2, and carry out data transfer between the computer 10 and the semiconductor memory 17. The resource manager 21 carries out an exclusive control in order to prevent the channel adapters $20_0$ through $20_n$ from competing with each other for access to the semiconductor memory 17. The table storage 22 stores necessary information for the resource manager 21 to carry out the exclusive control. The channel adapters $20_0$ through $20_n$, the resource manager 21, and the semiconductor memory 17 are connected to a bus 23. There may be 16 of the channel adapters $20_0$ through $20_{15}$, for example. The channel adapters $20_0$ through $20_i$ and respective paths 0 through i are classified into the same group, since they are connected to the same CPU 11. Also, the channel adapters $20_{i+1}$ through $20_{15}$ and respective paths i+1 through 15 are classified into the same group, since they are connected to the same CPU 12.

The semiconductor memory 17 stores data which is transferred from the computer 10. The semiconductor memory 17 may be divided into 64 logical drives, for example, when it is used in the system.

The table storage 22 includes a path table, a busy-counter table, and an interruption-counter table.

Figure 4:
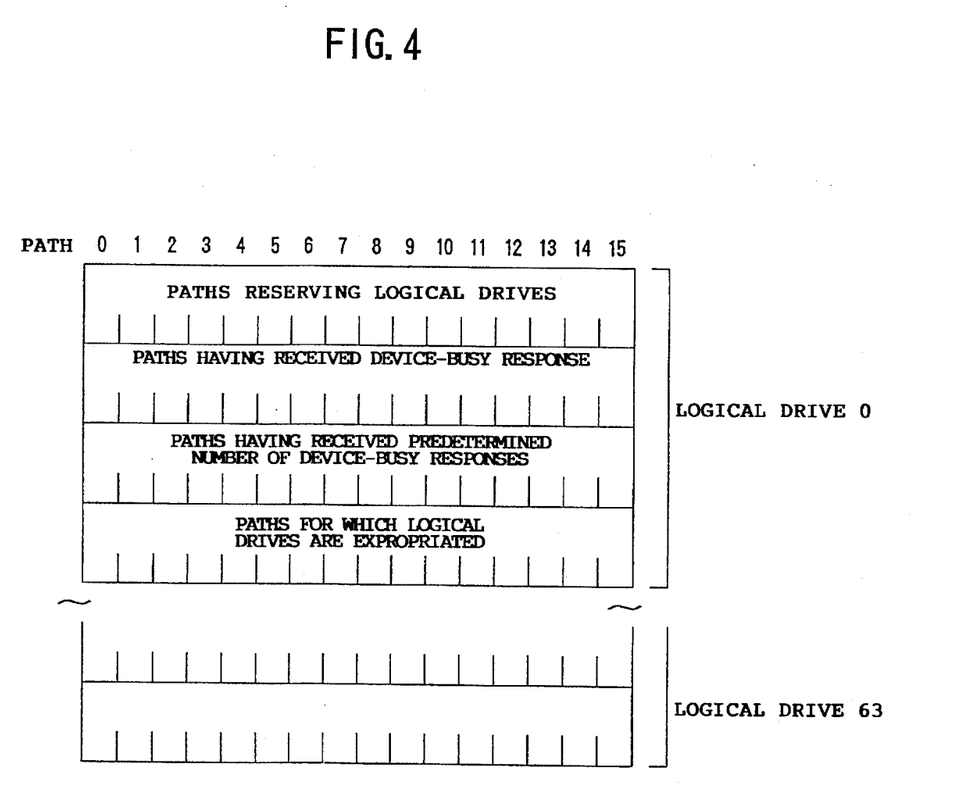
FIG. 4 is an illustrative drawing showing a path table stored in a table storage of FIG. 3.

FIG. 4 shows contents of the path table. As shown in FIG. 4, the path table contains information for each logical drive with regard to paths reserving logical drives, paths having received a device-busy response, paths having received a predetermined number of device-busy responses, and paths for which logical drives are expropriated. The information on each of these paths is stored as a bit map indicating a corresponding path. That is, as shown in FIG. 4, each of 16 bits arranged in a row corresponds to a respective path. Hereinafter, a portion of the path table regarding the paths reserving logical drives is referred to as an reserving-path area, a portion regarding the paths with a device-busy response is referred to as a busy-response-path area, a portion regarding the paths having received the predetermined number of device-busy responses is referred to as a threshold-path area, and a portion regarding the paths for which logical drives are expropriated is as an expropriating-for-path area.

Figure 5:
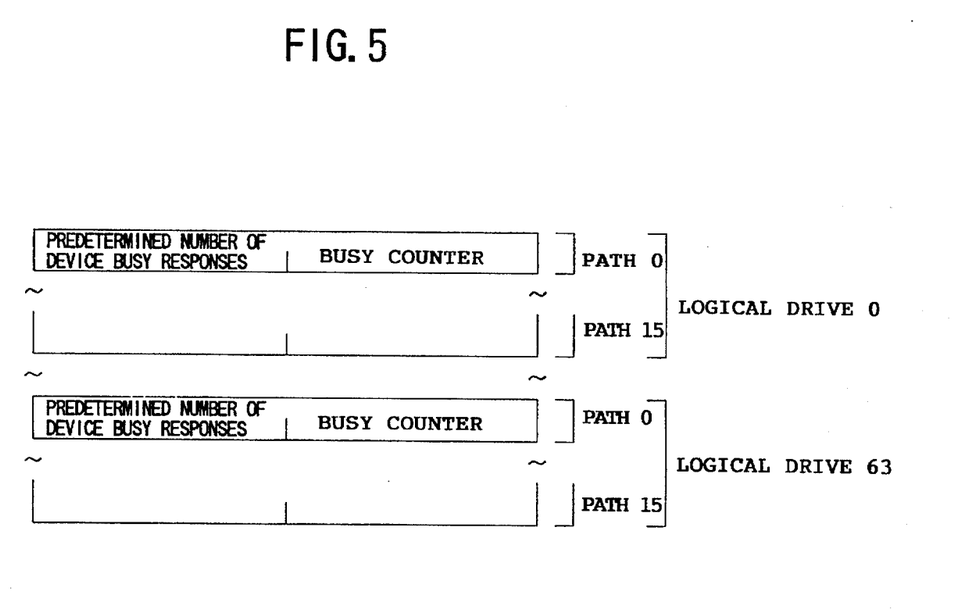
FIG. 5 is an illustrative drawing showing a busy-counter table stored in a table storage of FIG. 3.

FIG. 5 shows contents of the busy-counter table, which serves as the counter unit M4 of FIGS. 2A and 2B. As shown in FIG. 5, the busy-counter table contains a busy counter and the predetermined number of busy responses for each path and for each logical drive.

Figure 6:
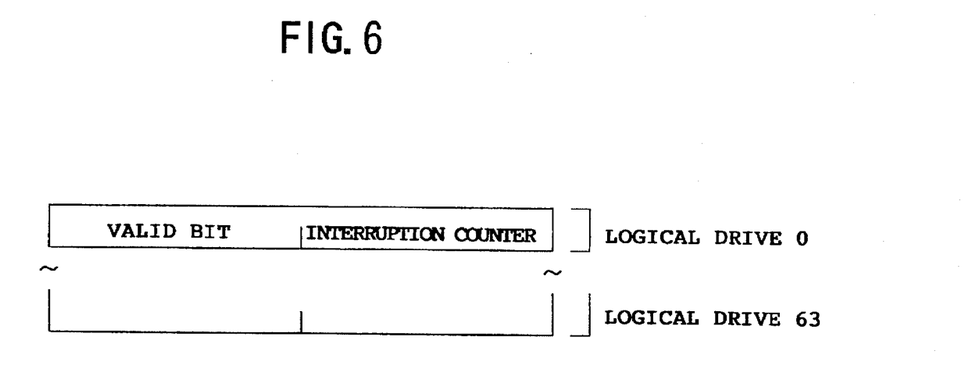
FIG. 6 is an illustrative drawing showing an interruption-counter table stored in a table storage of FIG. 3.

FIG. 6 shows contents of the interruption-counter table. As shown in FIG. 6, the interruption counter table contains a valid bit and an interruption counter for each logical drive.

Figure 7:
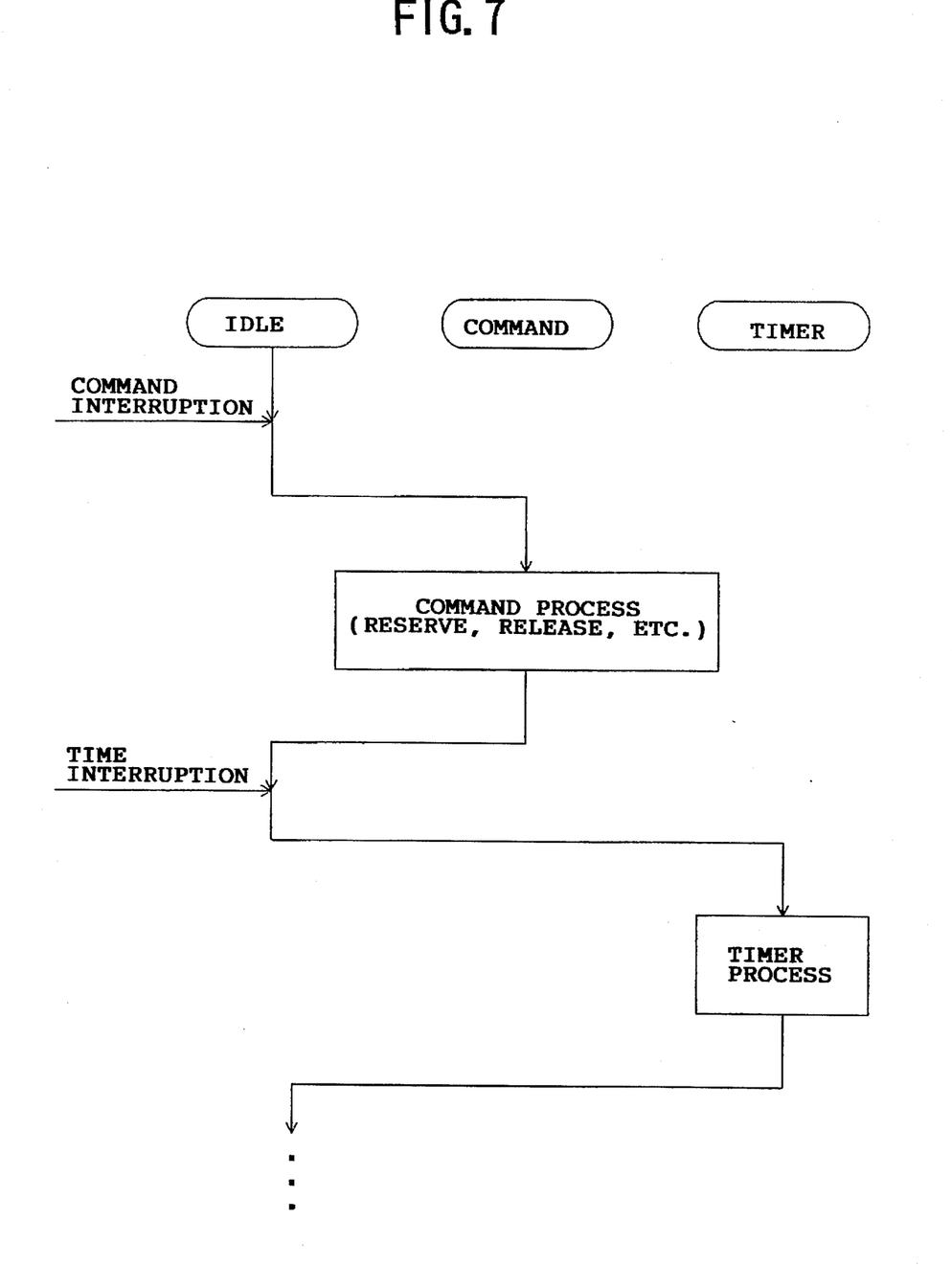
FIG. 7 is an illustrative drawing showing a structure of a control program for an operation of a resource manager of FIG. 3.

FIG. 7 shows a structure of a control program upon which an operation of the resource manager 21 is based. The resource manager 21 normally stays at an idle state in a loop. When one of the channel adapters $20_0$ through $20_n$ provides a command for the resource manager 21, the resource manager 21 is interrupted to carry out a process for this command. When there is a timer interruption, the resource manager 21 is interrupted to carry out a timer process, and, then, returns to the idle state again.

In the following, various processes carried out by the resource manager 21 will be described.

Figure 8:
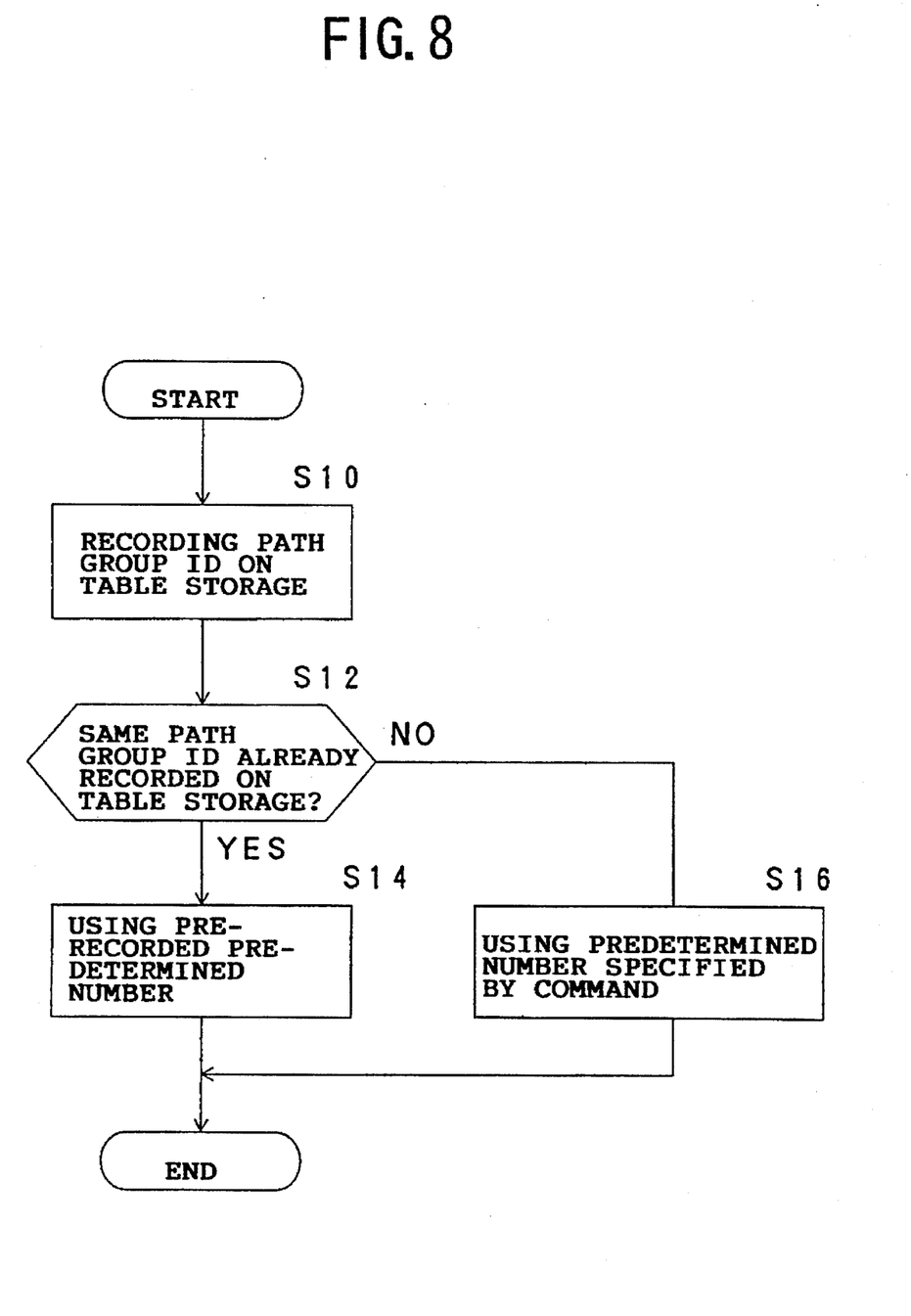
FIG. 8 is a flowchart of a process of setting a predetermined number of drive-busy responses in the busy-counter table of FIG. 5.

FIG. 8 shows a flowchart of a process of setting the predetermined number for the busy-counter table. The resource manager 21 receives a command from the computer 10 to set the predetermined number for an indicated busy counter of an indicated logical drive. At a step S10, the resource manager 21 records on the table storage 22 a path group ID of a path to which the predetermined number is to be set.

At a step S12, a check is made whether the same path group ID is already recorded on the table storage 22. If it is recorded, the procedure goes to a step S14. At the step S14, a pre-recorded predetermined number of device-busy responses is read from the busy-counter table, and is used as the predetermined number of device-busy responses for the busy counter indicated by the command. If the same path group ID is not recorded, the procedure goes to a step S16. At the step S16, a predetermined number specified by the command is used as the predetermined number for the busy counter indicated by the command.

In the following description of the processes carried out by the resource manager 21, it is assumed that paths are not grouped for the sake of simplicity of explanation. It should be noted that although changes in expression should be made such as a change from "path" to "path group" or "paths" when paths are grouped, there is no fundamental change in these processes. (However, when it seems to be better to specify what to do in the case of path groups, explanations will be provided in parenthesis.)

Figure 9:
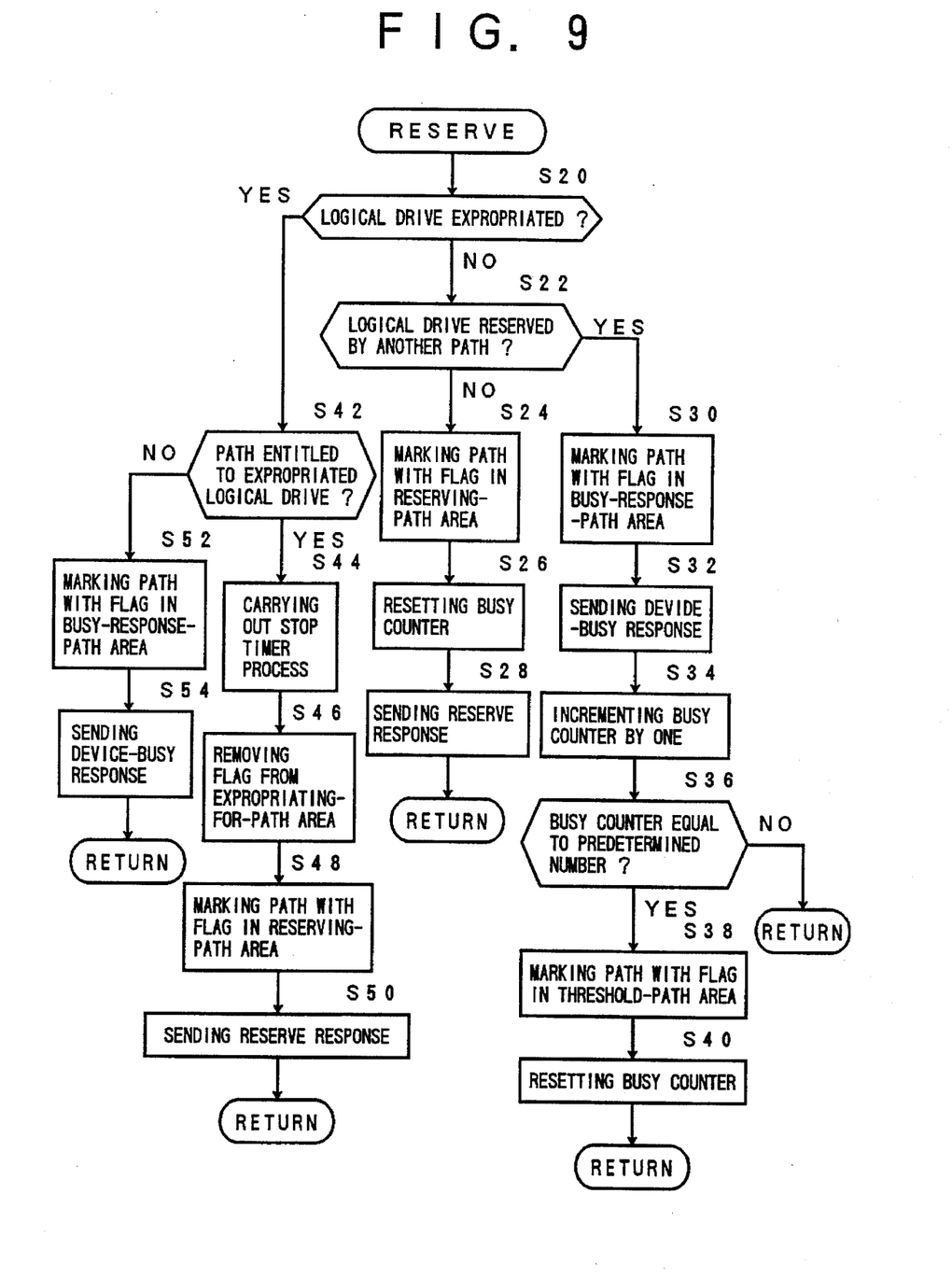
FIG. 9 is a flowchart of a reserving process carried out by a resource manager of FIG. 3.

FIG. 9 shows a flowchart of a reserving process carried out by the resource manager 21. In the figure, one of the CPUs 11 and 12 issues a reserve command, and the resource manager 21 receives the reserve command via a path corresponding to one of the channel adapters $20_0$ through $20_n$. At a step S20, a check is made by looking up the expropriating-for-path area of the path table whether a logical drive indicated by the reserve command is expropriated. If it is not expropriated, the procedure goes to a step S22.

At the step S22, a check is made by looking up the reserving-path area of the path table whether the indicated logical drive is reserved by another path. If it is not reserved, the procedure goes to a step S24.

At the step S24, the path through which the reserve command is provided is marked by a flag in the reserving-path area of the path table for the indicated logical drive. (If this path forms a path group with other paths, all paths belonging to that path group are marked by a flag.) At a step S26, a busy counter in the busy-counter table corresponding to the marked path of the indicated logical drive is reset. At a step S28, the resource manager 21 sends a reserve response to a channel adapter of the marked path. This ends the procedure.

If the indicated logical drive turns out to be reserved at the step S22, the procedure proceeds to a step S30. At the step S30, the pertinent path is marked by a flag in the busy-response-path area of the path table for the indicated logical drive. (If this path forms a path group with other paths, all paths belonging to that path group are marked by a flag.) At a step S32, a device-busy response is sent to the channel adapter of the pertinent path. At a step S34, the busy counter of the busy-counter table is incremented by one for the pertinent path of the indicated logical drive. At a step S36, a check is made whether an incremented number of the busy counter is the same as the predetermined number of device-busy responses defined for the pertinent path for the indicated logical drive. If it is not the same, this is the end of the procedure. If it is the same, the procedure goes to a step S38. At the step S38, the pertinent path is marked by a flag in the threshold-path area of the path table. (If this path forms a path group with other paths, all paths belonging to that path group are marked by a flag.) At a step S40, the busy counter of the busy-counter table is reset to zero for the pertinent path of the indicated logical blocks.

If the indicated logical drive turns out to be expropriated, the procedure goes to a step S42. At the step S42, a check is made whether the reserve command is provided through a path to which the indicated logical drive is expropriated for. If the reserve command comes from the path entitled to reserve the indicated logical drive, the procedure goes to a step S44. At the step S44, a stop timer process, which will be explained later in detail, is carried out. At a step S46, a flag marking the pertinent path is removed from the expropriating-for-path area of the path table for the indicated logical drive. At a step S48, the pertinent path is marked by a flag in the reserving-path area of the path table for the indicated logical drive. (If this path forms a path group with other paths, all paths belonging to that path group are marked by a flag.) At a step S50, a reserve response is sent to a channel adapter of the pertinent path. This ends the procedure.

If it turns out at the step S42 that the reserve command does not come from the entitled path, the procedure goes to a step S52. At the step S52, this path is marked by a flag in the busy-response-path area of the path table for the indicated logical drive. (If this path forms a path group with other paths, all paths belonging to that path group are marked by a flag.) At a step S54, a device-busy response is sent to the channel adapter of the path. This ends the procedure.

Figure 10:
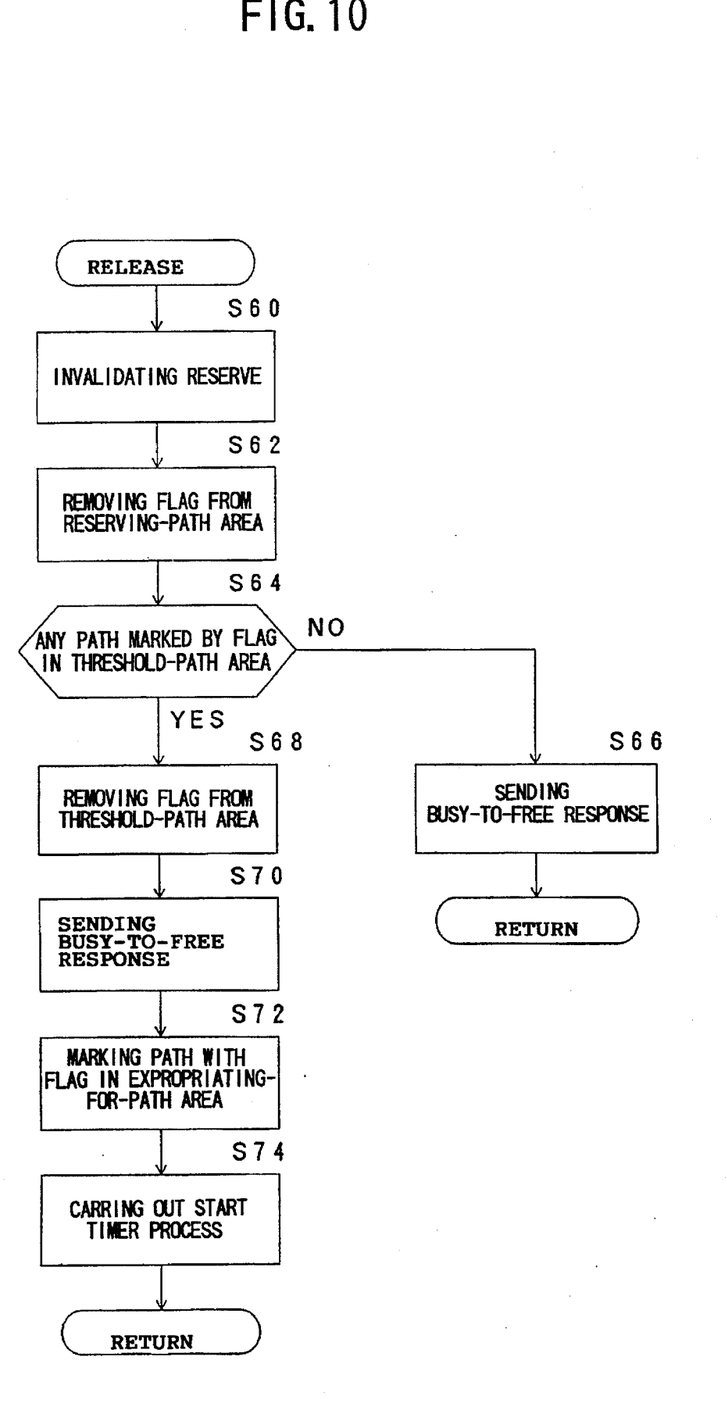
FIG. 10 is a flowchart of a release process carried out by the resource manager of FIG. 3.

FIG. 10 shows a flowchart of a release process carried out by the resource manager 21. In the figure, the resource manager 21 receives a release command from one of the CPUs 11 and 12 via a path among the paths corresponding to the channel adapters $20_0$ through $20_n$. At a step S60, the resource manager 21 invalidates the control held by the path over a logical drive which is indicated by the release command. At a step S62, a flag of the path is removed from the reserving-path area of the path table for the indicated logical drive. At a step S64, a check is made whether there is a path marked by a flag in the threshold-path area of the path table for the indicated logical drive. If there is no path marked by a flag, the procedure goes to a step S66. At the step S66, a busy-to-free response is sent to a channel adapter of a path which is marked by a flag in the busy-response-path area of the path table for the indicated logical drive.

If it turns out at the step S64 that there is a path marked by a flag in the threshold-path area, the procedure goes to a step S68. At the step S68, the flag marking the path in the threshold-path area for the indicated logical drive is removed. At a step S70, a busy-to-free response is sent to a channel adapter of the path whose flag is removed at the step S68. At a step S72, the path is marked by a flag in the expropriating-for-path area of the path table for the indicated logical drive. (If this path forms a path group with other paths, all paths belonging to that path group are marked by a flag.) The step S72 corresponds to the expropriation unit M5 of FIG. 2. At a step S74, a start timer process, which will be described later in detail, is carried out. This ends the procedure.

Figure 11:
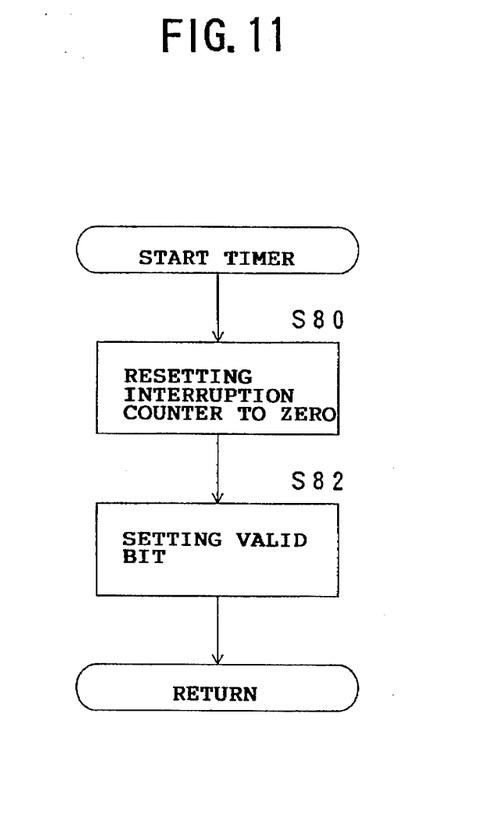
FIG. 11 is a flowchart of a stop timer process carried out by the resource manager of FIG. 3.

FIG. 11 shows a flowchart of the start timer process. At a step S80, an interruption counter of the interruption counter table is reset to zero for the logical drive indicated by the release command. At a step S82, a valid bit of the interruption counter table for the indicated logical drive is set. This ends the process.

Figure 12:
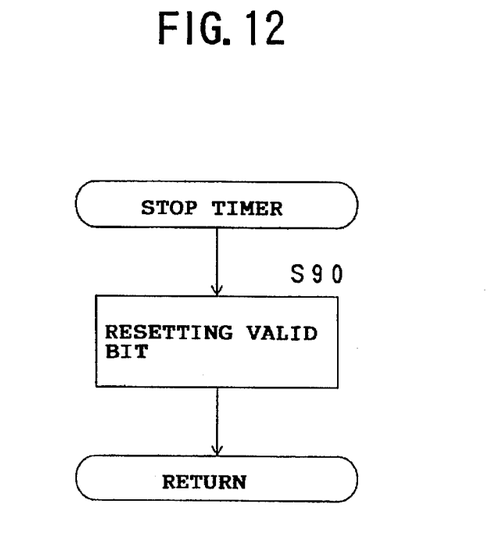
FIG. 12 is a flowchart of a start timer process carried out by the resource manager of FIG. 3.

FIG. 12 shows a flowchart of the stop timer process. At a step S90, a valid bit of the interruption counter table is reset for the logical drive indicated by the reserve command. This ends the process.

Figure 13:
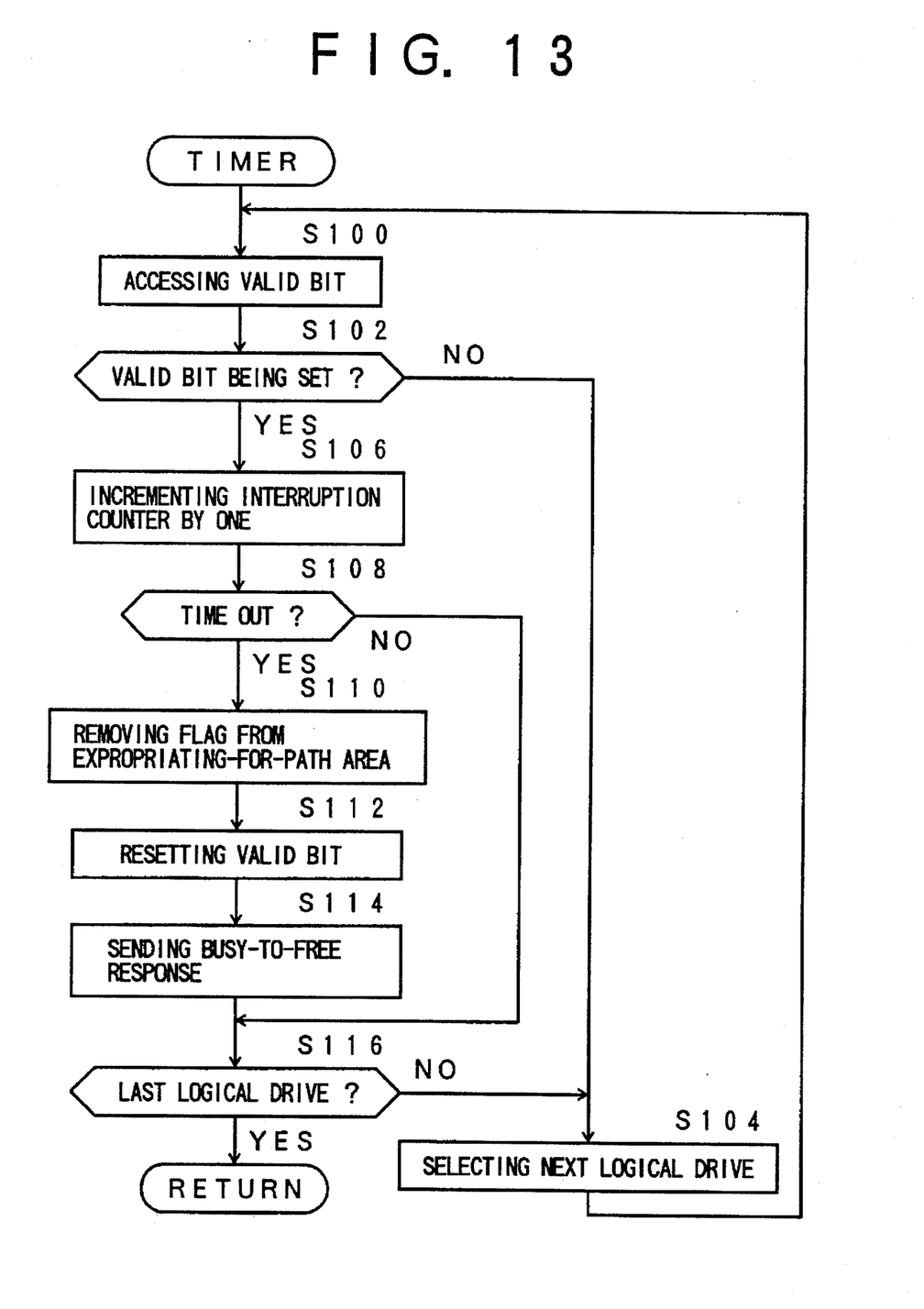
FIG. 13 is a timing chart showing an operation of a resource manager of FIG. 3 responding to reserve commands and release commands issued by two channel adapters.

FIG. 13 shows a flowchart of a timer interruption process which is carried out by the resource manager 21 once in every period of a predetermined length. At a step S100, a valid bit in the interruption counter table is accessed for each logical drive in an ascending order of drive numbers starting from zero. At a step S102, a check is made whether the valid bit is valid (set). If it is not valid, the procedure goes to a step S104 to select the next logical drive, and, then, goes back to the step S100.

If the valid bit turns out to be valid at a step S102, the procedure proceeds to a step S106. At the step S106, a corresponding interruption counter is incremented by one. At a step S108, a check is made whether the incremented count is larger than the predetermined number, i.e., whether a time for the expropriation of a corresponding logical drive is up. If the time is not up, the procedure goes to a step S116. If the time is up, the procedure goes to a step S110. At the step S110, flags of the corresponding logical drive in the expropriating-for-path area are removed. At a step S112, the valid bit of the corresponding logical drive in the interruption counter table is reset. At a step S114, a busy-to-free response is sent to a channel adapter of a path which is marked by a flag in the busy-response-path area for the corresponding logical drive.

At the step S116, a check is made whether a valid bit in the interruption table is accessed up to the last logical drive 64. If it is not, the procedure goes to the step S104 to select the next logical drive, and, then, goes back to the step S100. If a valid bit is accessed up to the last logical drive 64, this ends the process.

Figure 14:
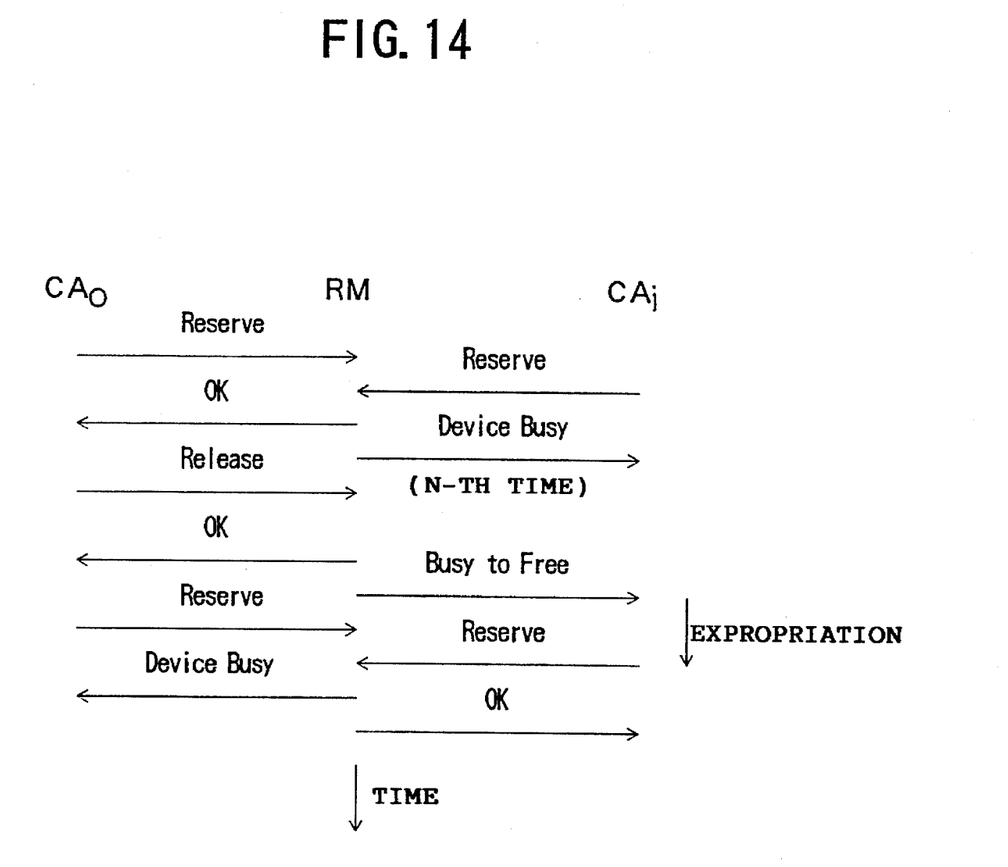
FIG. 14 is a timing chart showing an operation of the resource manager of FIG. 3 responding to reserve commands and release commands issued by two channel adapters.

FIG. 14 shows a timing chart of an operation of the resource manager 21 responding to reserve commands and release commands issued by two channel adapters according to the present invention.

In FIG. 14, a channel adapter $CA_0$ issues a reserve command requesting the use of a logical drive, and, then, another channel adapter $CA_i$ issues a reserve command for the same logical drive. Since the request for the use of the logical drive is made by the channel adapter $CA_0$ first, the resource manager 21 sends a reserve response to the channel adapter $CA_0$, and, then, sends a device-busy response to the channel adapter $CA_i$.

Assume that the device-busy responses have been already sent N times, which is the predetermined number of device-busy responses. When the channel adapter $CA_0$ provides a release command, the resource manager 21 releases the logical drive and sends a release response to the channel adapter $CA_0$. Also, the resource manager 21 expropriates the logical drive, and sends a busy-to-free response to the channel adapter $CA_i$.

Then, the channel adapter $CA_0$ issues a reserve command again before the channel adapter $CA_i$ does. However, since the resource manager 21 has expropriated the logical block, a device-busy response is sent to the channel adapter $CA_0$, and a reserve response is sent to the channel adapter $CA_i$.

In this manner, it can be avoided that a certain path ends up receiving device-busy responses repeatedly without getting access to the logical drive. Thus, the number of reserve responses can be averaged over across each path or each path group.

Figure 15:
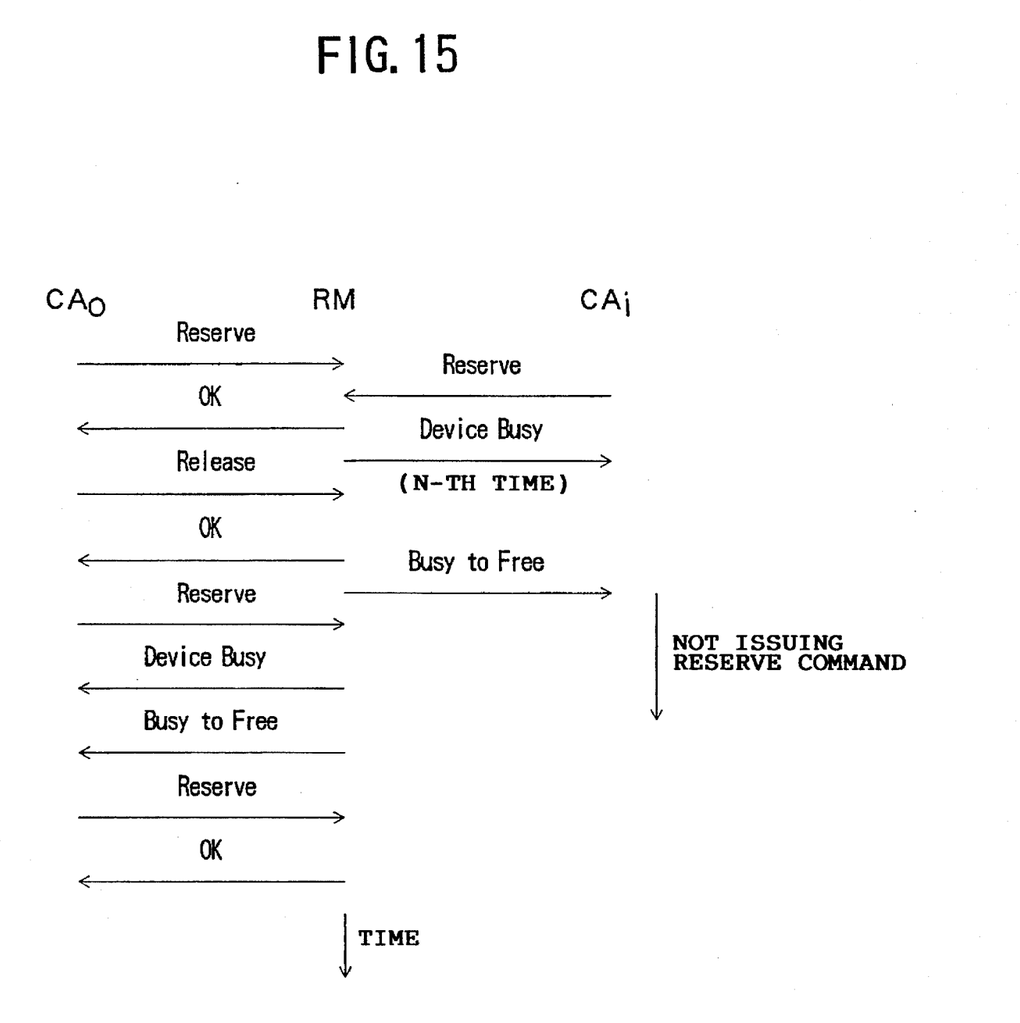
FIG. 15 is a timing chart showing a different operation of the resource manager of FIG. 3 responding to reserve commands and release commands issued by two channel adapters.

FIG. 15 shows a different timing chart of an operation of the resource manager 21 responding to reserve commands and release commands issued by two channel adapters according to the present invention.

In FIG. 15, a channel adapter $CA_0$ issues a reserve command requesting the use of a logical drive, and, then, another channel adapter $CA_i$ issues a reserve command for the same logical drive. Since the request for the use of the logical drive is made by the channel adapter $CA_0$ first, the resource manager 21 sends a reserve response to the channel adapter $CA_0$, and, then, sends a device-busy response to the channel adapter $CA_i$.

Assume that the device-busy responses have been already sent N times, which is the predetermined number of device-busy responses. When the channel adapter $CA_0$ provides a release command, the resource manager 21 releases the logical drive and sends a release response to the channel adapter $CA_0$. Also, the resource manager 21 expropriates the logical drive, and sends a busy-to-free response to the channel adapter $CA_i$.

For a predetermined period of time until the count of the interruption counter becomes the predetermined number, a device-busy response is sent to the channel adapter $CA_0$ when it issues a reserve command. However, if the channel adapter $CA_i$ does not issue a reserve command during this predetermined period, the logical drive expropriated for the channel adapter $CA_i$ is set free, and a busy-to-free response is sent to the channel adapter $CA_0$. Then, if the channel adapter $CA_0$ issues a reserve command again, it will receive a reserve response.

In this manner, if a path which made an expropriation does not issue a reserve command for the predetermined period of time, the reservation is invalidated. Thus, it can be avoided that paths issuing a reserve command cannot use a logical drive for a long time because the logical drive is expropriated for a path not issuing a reserve command.

As described above, according to the present invention, when device-busy responses are directed to the same transfer unit M1 the predetermined number of times, the logical storage unit requested by the transfer unit M1 can be seized by the expropriation unit M5. Then, the expropriation unit M5 can hand over the control of the logical storage unit to the transfer unit M1. Thus, the transfer unit M1 can exclusively use the logical storage unit ahead of other transfer units M1 without getting device-busy responses indefinitely.

Also, according to the present invention, an input/output control device includes the expropriation-period setting unit M6 for setting the period during which the logical storage unit is seized by the expropriation unit M5. Thus, this period can be set to an appropriate length lest other transfer units M1 cannot use the logical storage unit for a long time.

Further, according to the present invention, the expropriation period can be set for each logical storage unit and for each transfer unit M1. Thus, the predetermined number of device-busy responses necessary for initiating the expropriation can be set differently for each logical storage unit and for each transfer unit M1.

Also, according to the present invention, a path which has reserved a logical storage unit can be recorded in the reserving-path area of the path table for each logical storage unit and for each transfer unit M1. Thus, which path has the control of which logical storage unit can be readily known.

Further, according to the present invention, a path which has received a device-busy response can be recorded in the busy-response-path area of the path table for each logical storage unit and for each transfer unit M1. Thus, which path has received a busy response from which logical storage unit can be readily known.

Also, according to the present invention, a path which has received device-busy responses the predetermined number of times can be recorded in the threshold-path area of the path table for each logical storage unit and for each transfer unit M1. Thus, which path is entitled to claim the control of which logical storage unit can be readily known.

Further, according to the present invention, a path for which the expropriation unit M5 expropriates a logical storage unit can be recorded in the expropriating-for-path area in the path table for each logical storage unit and for each transfer unit M1. Thus, which logical storage drive is expropriated for which path can be readily known.

Further, the present invention is not limited to these embodiments, but various variations and modifications may be made without departing from the scope of the present invention.

What is claimed is:

1. An input/output control device controlling data exchange between computers and memory units, said input/output control device comprising:

transfer units connected to said computers and accessing said memory units so as to effect said data exchange;

exclusive-control means for preventing more than one of said transfer units from having access to the same one of said memory units by sending device-busy responses to all but one of said transfer units;

busy-count means for counting a number of said device-busy responses for each of said transfer units regarding each of said memory units;

control-information-storage means for storing information which includes said number of said device-busy responses; and expropriation means for taking control of one of said memory units when a number of said device-busy responses for one of said transfer units regarding said one of said memory units becomes a predetermined number, so that said one of said memory units can be set aside for use by said one of said transfer units.

2. The input/output control device as claimed in claim 1, further comprising expropriation-period setting means for setting a length of a time period during which said expropriation means holds said control.

3. The input/output control device as claimed in claim 1, wherein said transfer units form groups, and a memory unit accessed by one of said transfer units belonging to one of said groups can be accessed by any one of said transfer units belonging to said one of said groups.

4. The input/output control device as claimed in claim 3, wherein said busy-count means counts said number of said device-busy responses such that said number of said device-busy responses is the same for the same one of said groups.

5. The input/output control device as claimed in claim 4, wherein said predetermined number is the same for the same one of said groups.

6. The input/output control device as claimed in claim 3, wherein said control-information-storage means includes information regarding said transfer units having said access, and wherein said information is provided for each of said transfer units regarding each of said memory units, and is the same for the same one of said groups.

7. The input/output control device as claimed in claim 3, wherein said control-information-storage means includes information regarding said transfer units having received said device-busy responses, and wherein said information is provided for each of said transfer units regarding each of said memory units, and is the same for the same one of said groups.

8. The input/output control device as claimed in claim 3, wherein said control-information-storage means includes information regarding said transfer units having said number of said device-busy responses equal to said predetermined number, and wherein said information is provided for each of said transfer units regarding each of said memory units, and is the same for the same one of said groups.

9. The input/output control device as claimed in claim 3, wherein said control-information-storage means includes information regarding said transfer units for which said memory units are being controlled by said expropriation means, and wherein said information is provided for each of said transfer units regarding each of said memory units, and is the same for the same one of said groups.

10. The input/output control device as claimed in claim 1, wherein said predetermined number is set for each of said transfer units regarding each of said memory units.

11. The input/output control device as claimed in claim 1, wherein said control-information-storage means includes information regarding said transfer units having said access, and said information is provided for each of said transfer units regarding each of said memory units.

12. The input/output control device as claimed in claim 1, wherein said control-information-storage means includes information regarding said transfer units having received said device-busy responses, and said information is provided for each of said transfer units regarding each of said memory units.

13. The input/output control device as claimed in claim 1, wherein said control-information-storage means includes information regarding said transfer units having said number of said device-busy responses equal to said predetermined number, and said information is provided for each of said transfer units regarding each of said memory units.

14. The input/output control device as claimed in claim 1, wherein said control-information-storage means includes information regarding said transfer units for which said memory units are being controlled by said expropriation means, and said information is provided for each of said transfer units regarding each of said memory units.

15. The input/output control device as claimed in claim 1, wherein said memory units comprise logical storage units formed by dividing a single memory.

16. The input/output control device as claimed in claim 15, wherein said single memory comprises a semiconductor memory.

17. The input/output control device as claimed in claim 16, wherein each of said computers comprises a CPU (central processing unit).

* * * * *